May 20, 1947.  S. B. WHITE  2,420,693
MODULATED RADIO PULSE REMOTE CONTROL SYSTEM
Filed Aug. 8, 1944  5 Sheets-Sheet 4

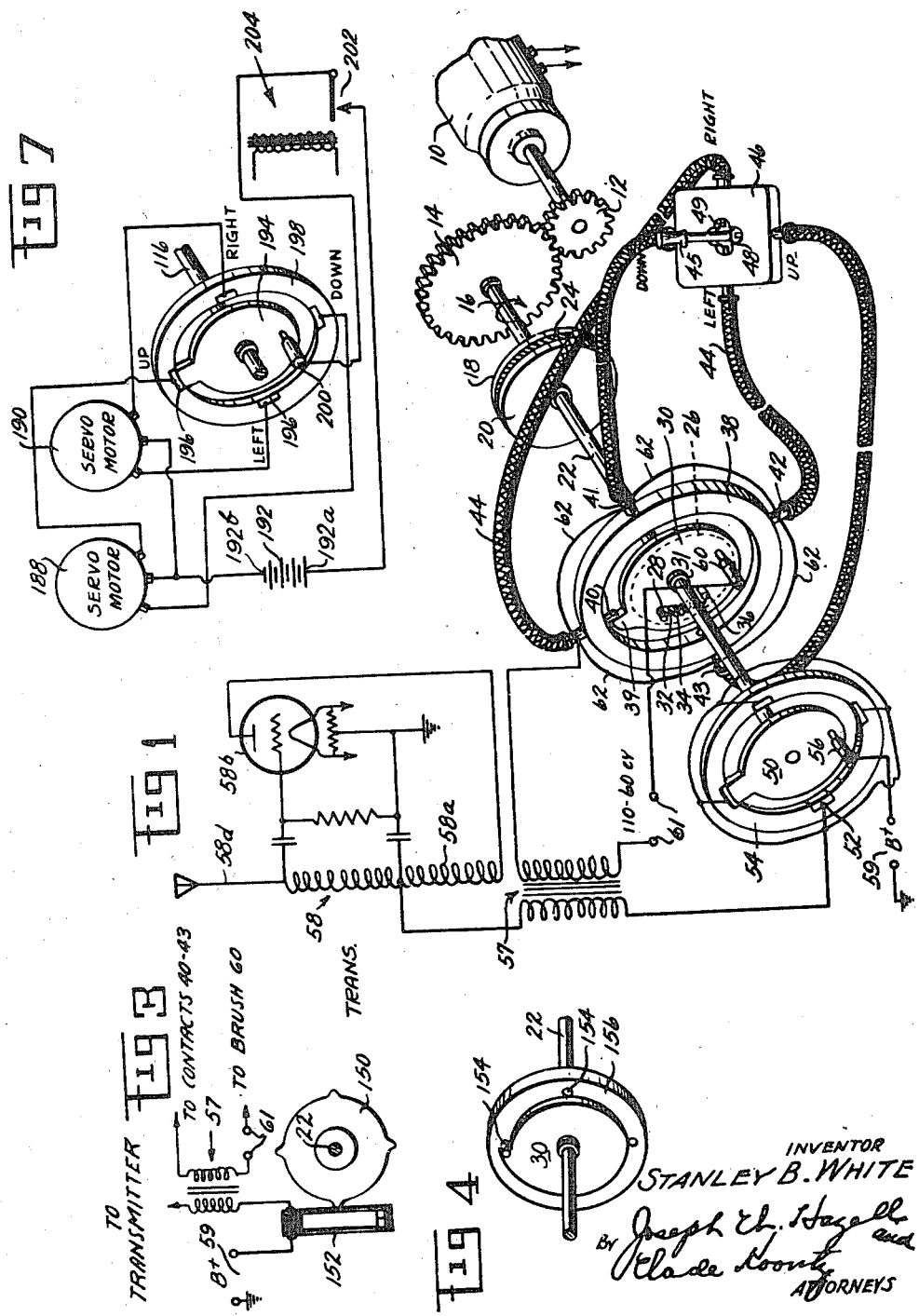

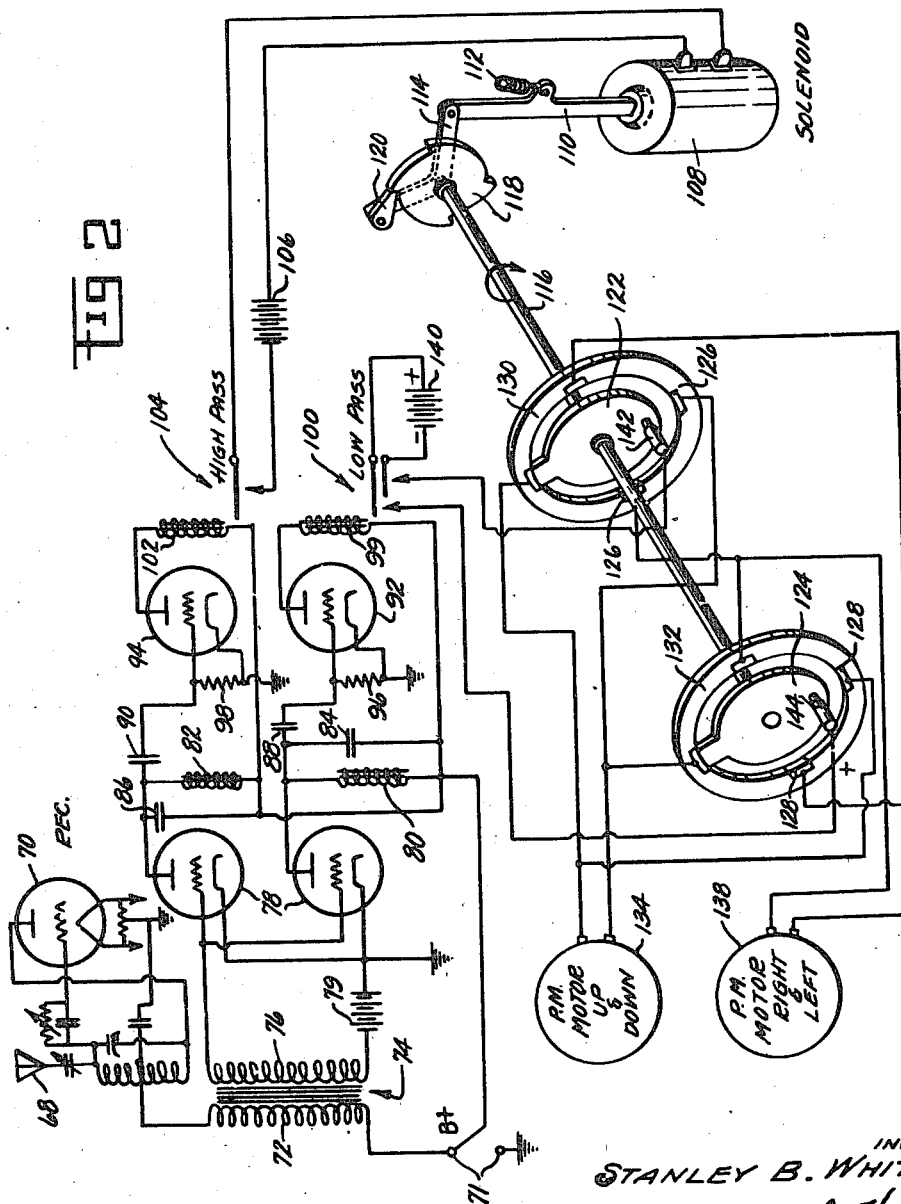

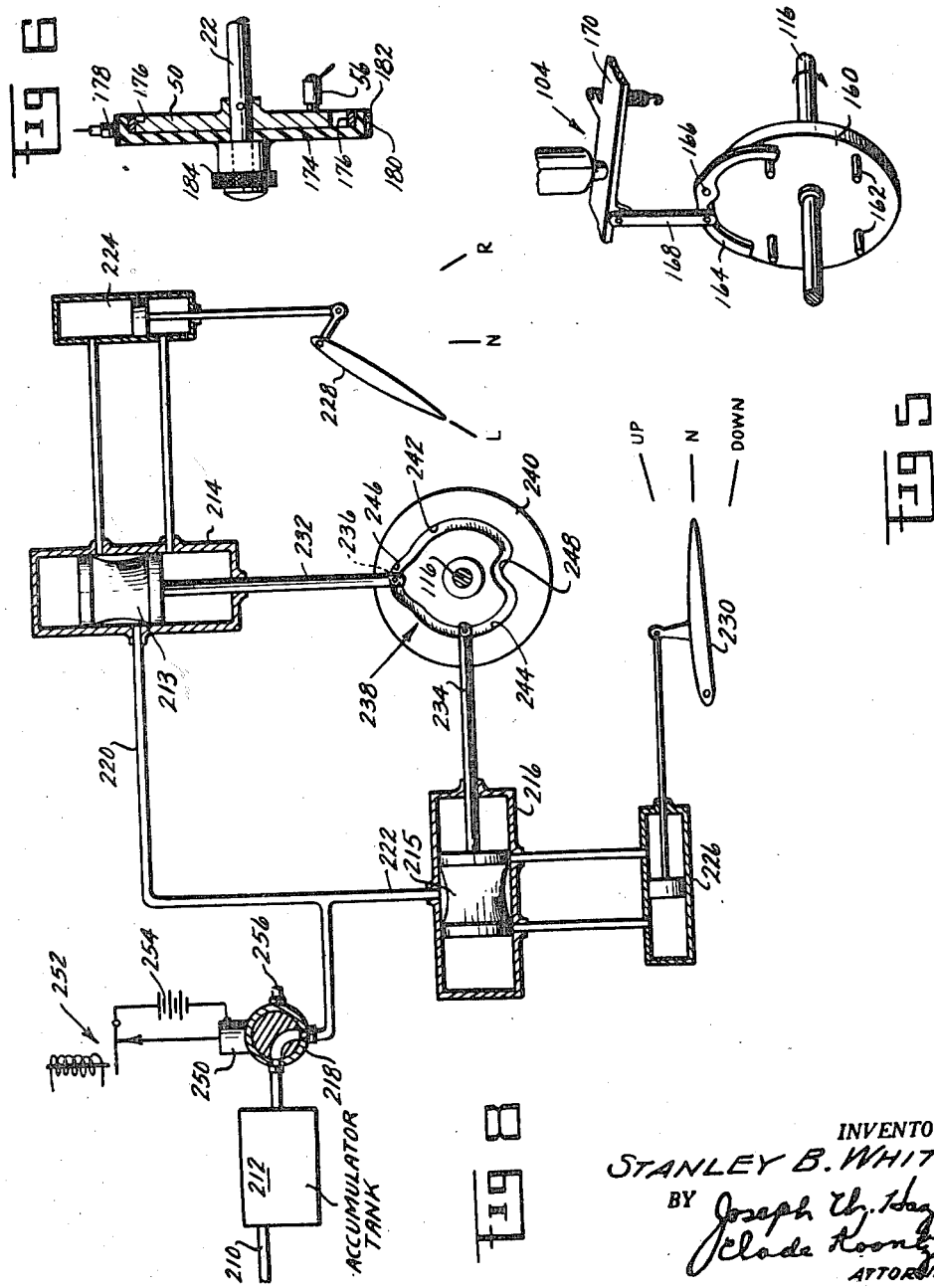

INVENTOR.
STANDLEY B. WHITE
BY Wade Koontz
ATTORNEY

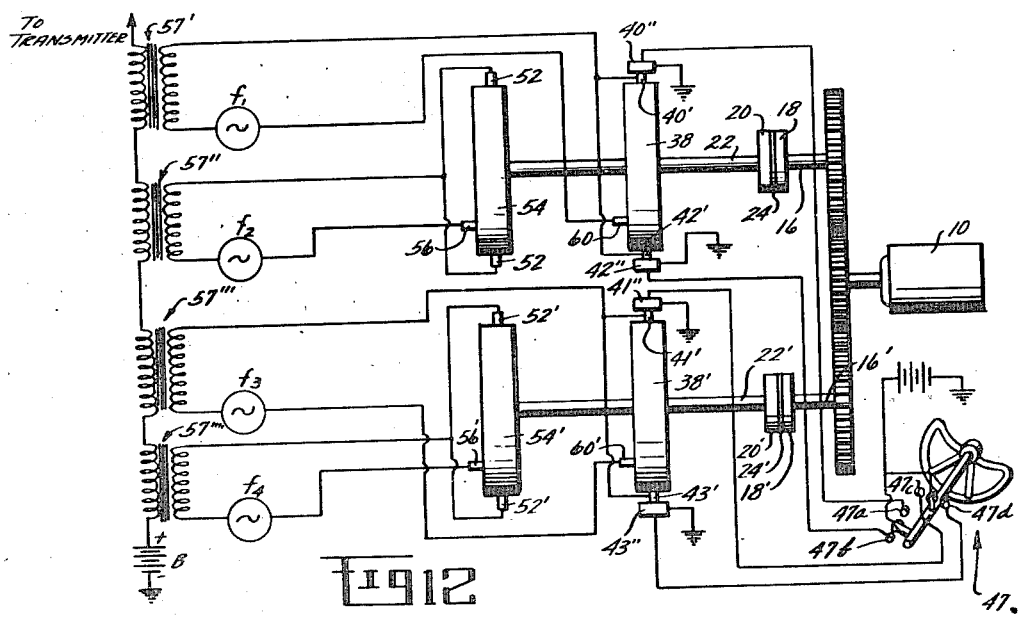
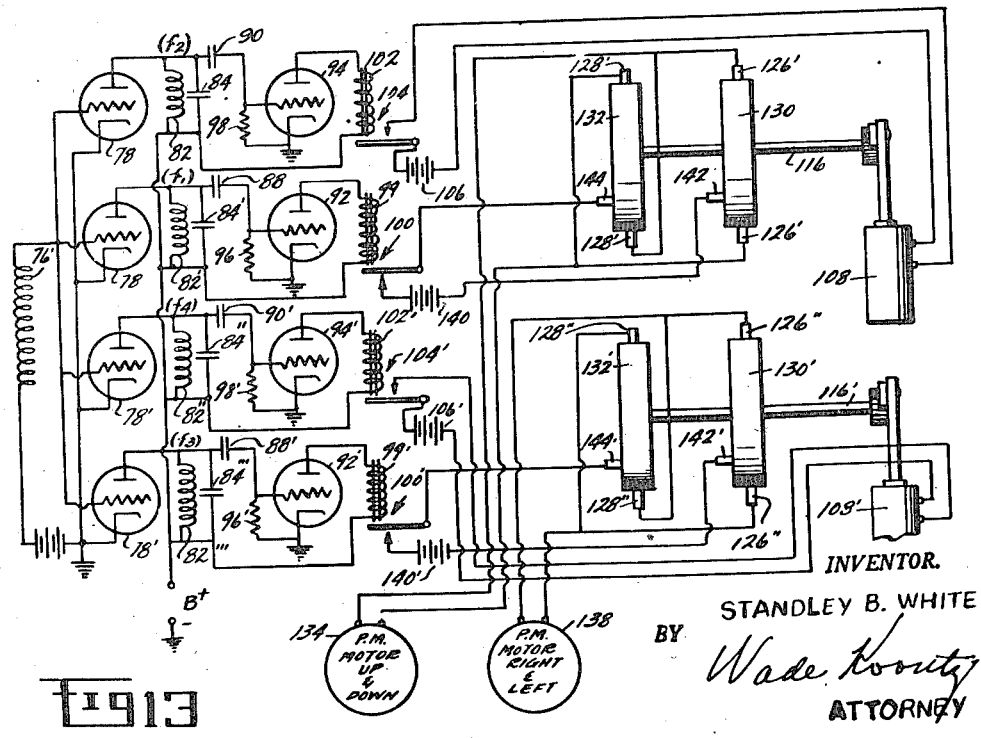

Patented May 20, 1947

2,420,693

UNITED STATES PATENT OFFICE 2,420,693

MODULATED RADIO PULSE REMOTE CONTROL SYSTEM

Stanley B. White, Dayton, Ohio

Application August 8, 1944, Serial No. 548,590

11 Claims. (Cl. 250—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a system for controlling the movement of airplanes, boats, automobiles, etc., from a distance in a new and simplified manner. In many of the prior art devices of a similar nature each additional type of control being applied to the distant object rquired the use of additional apparatus. According to the present invention, however, any reasonable number of controls may be applied to the controlled object without sensibly increasing the amount of controlling apparatus required. Furthermore, the new system which I have developed is extremely simple and light in weight but at the same time sturdy, reliable and positive in action.

The system herein proposed for the purpose of effecting the remote control of a distant mechanism such as an airplane, automobile, boat, etc. consists in repeatedly transmitting a group of radio-frequency pulses which are modulated with an audio-frequency signal when a control is to be applied to the distant object. In the modification of the invention herein shown and described, the radio transmitter is periodically switched on and off by means of an automatic mechanism so as to cause a series of radio-frequency pulses to be transmitted to the distant apparatus. These pulses are received by means of a radio receiver located at the distant apparatus and serve to maintain a control device at the object in synchronism with the automatic mechanism at the transmitter. When a control is to be applied, the automatic mechanism at the transmitter is stopped and a continuous radio-frequency wave is transmitted which causes the control device at the distant mechanism to likewise be stopped. The control of the remote object is then effected by modulating the radio-frequency carrier with a suitable audio frequency. It is entirely possible, however, and, in fact, may be found to be preferable in certain instances to transmit a continuous carrier wave which is modulated with two distinct audio frequencies, one of which is periodically interrupted at the transmitter for the purpose of maintaining synchronism between the transmitter mechanism and the receiver mechanism, and the second of which is used to effect the desired control.

Accordingly, it is an object of the present invention to provide a remote control system in which any reasonable number of controls may be applied to the remote object without materially increasing either the complexity of the system or the amount of apparatus required.

Another object of the invention is to provide a remote control system which is simple, compact, and light in weight and which enables a number of different controls to be applied to a remote apparatus by means of a single radio-frequency carrier wave modulated with a second wave of lower frequency.

Another object of the invention is to provide a system of the type described in the foregoing object in which the desired control may be applied for as long a period as may be desirable.

Another object of the invention is to provide a remote control system which is simple, compact, and light in weight but at the same time, sturdy, reliable and positive in action.

A further object of the invention is to provide a remote control system in which any two controls of a number of different controls may be simultaneously applied to a remote mechanism through the use of a single radio-frequency carrier wave modulated with a plurality of waves of lower frequency.

Still a further object of the invention is to provide a remote control system for guiding the flight of a distant aircraft in which a "stick" type of control is provided at the control station.

A preferred embodiment of the present invention is illustrated in the accompanying drawings, in which Fig. 1 is a perspective view of the mechanism located at the transmitting station together with a wiring diagram of a simple form of transmitter;

Fig. 2 is a perspective view of the mechanism located in the aircraft or other mechanism to be controlled, together with a wiring diagram of a superregenerative type of receiver;

Fig. 3 shows a modified form of a rotary contact device for switching the radio transmitter on and off;

Fig. 4 shows a modified form of mechanism for stopping the rotary contact device at the transmitter in any one of several selected positions;

Fig. 5 illustrates a modified form of mechanism for controlling the rotation of the rotary control device at the distant object;

Fig. 6 illustrates a means for enabling the control mechanism at the receiving station to be brought into synchronism with that at the transmitting station;

Fig. 7 shows a modified form of the servomotor control mechanism located at the distant object;

Fig. 8 illustrates a further modification wherein compressed air servomotors may be utilized for effecting the desired control at the distant object in place of electrical servomotors;

Fig. 12 shows diagrammatically a mechanism for providing both pitch and yaw control to the robot aircraft; and Fig. 13 shows diagrammatically a receiver mechanism for the control mechanism of Fig. 12.

*Apparatus at control station*

Figure 9:
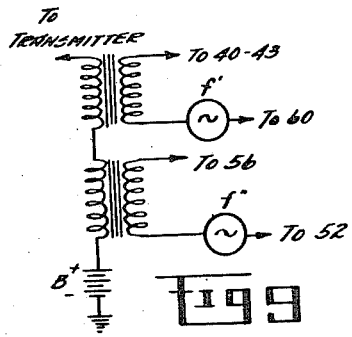
Fig. 9 shows a modification of the wiring diagram of Fig. 1 in which a single radio-frequency carrier wave may be modulated by two different audio-frequency control signals.

As shown in Fig. 1, the mechanism located at the transmitting station consists of a motor 10 which is adapted to drive a spur gear 12 secured to the end of the motor shaft. The gear 12 meshes with a larger spur gear 14 which is secured to one end of a shaft 16. Though not shown, the shaft 16 is understood to be suitably journalled in the framework of the mechanism and carries at its other end a clutch disc 18. A similar disc 20 is secured to one end of a shaft 22 journalled in the framework of the mechanism, this shaft being adapted to be yieldably driven by the shaft 16 through the medium of a suitable friction material 24 interposed between the clutch disks. Secured to an intermediate portion of the shaft 22 and insulated therefrom is a disc 26 in the face of which is mounted a driving pin 28. A disc-like stop member 30 of electrically conductive material is loosely journalled on a fibre sleeve 31 secured to the shaft 22 adjacent to the disc 26 and is provided with a short, arcuate slot 32 through which the driving pin 28 extends. The pin 28 is connected by a tension spring 34 with a pin 36 secured to the face of the member 30.

An annular ring 38 of insulating material is secured to the framework of the mechanism in a substantially coplanar relationship with respect to the stop member 30. Four electrically conducting plungers 40, 41, 42 and 43 are slidably journalled in the ring 38 for movement into or out of engaging relationship with a stop nose 39 formed on the edge of the disc 30. The plungers are normally held in their retracted, or outermost positions, by means of suitable springs, not shown, but may be selectively moved in toward the center of the ring by means of Bowden cables 44 attached thereto. The operator may cause any one of the plungers 40, 41, 42 or 43 to be depressed by means of the control stick 45, which is universally pivoted at its lower end for movement in all directions. The stick is guided in its fore and aft movements, as well as in its left and right movements, by means of a guide plate 46 which is provided with a cross shaped cut-out portion 48. In the extremity of each of the arms of the cross is located a plunger 49 operatively connected to one of the Bowden cables 44 so that by moving the stick to the limit of its movement in either a fore and aft or left and right direction, the appropriate Bowden cable will be operated and the selected plunger depressed so as to stop the rotation of the shaft 22 in any one of four positions.

Also secured to the shaft 22 and insulated therefrom is a rotary contact member 50 of electrically conductive material which is adapted to make contact with four electrically conducting segments 52 inserted in and spaced about the inner periphery of a hard rubber annular ring 54 secured to the framework of the mechanism. A conducting brush 56 bears against the face of the contact member 50 and is connected to the B+ supply of the transmitter as shown at 59. The contact segments 52 are electrically connected with one another and also through the secondary winding of a transformer 57 through an inductance 58a to the plate circuit of the tube 58b in the oscillator circuit of the transmitter 58. Hence, for each revolution of the shaft 22, the transmitter will be furnished with plate voltage at four distinct intervals. This will cause four radio frequency pulses to be emitted from the antenna 58a each time the shaft 22 makes one revolution.

In order to cause the transmitter to emit a continuous radio-frequency carrier wave which is modulated with a suitable control signal each time it is desired to apply a control to the remote mechanism, a modulating voltage from a sixty-cycle source is applied across the primary winding of a modulating transformer 57 whenever the stop nose 39 contacts one of the plungers 40—43. This is accomplished by providing a conducting brush 60 which bears against the face of the stop member 30 and is connected to one side of a sixty-cycle supply illustrated by the terminals 61. The other side of the sixty-cycle supply is connected through the primary winding of the transformer 57 to all of the plungers 40, 41, 42 and 43. The plungers are suitably positioned in the ring 38 and are electrically connected with one another by means of conductors 62. The conductors 62 may be dispensed with where the ring 38 is made of electrically conducting material and one side of the primary winding of the transformer 57 is connected thereto. Hence, when the nose 39 contacts one of the plungers, a modulating voltage will be applied to the primary of the transformer 57 and the radio-frequency carrier wave will be modulated with a sixty-cycle signal by way of the transformer secondary which is located in the plate circuit of the transmitter 58. Inasmuch as the stop member 30 causes the rotary contact element 50 to be stopped in one of its four contact-making positions whenever a plunger is depressed, a continuous carrier wave will be transmitted. Also, by virtue of the lost motion connection between the disc 26 secured to the shaft 22 and the stop member 30 loosely mounted on the shaft, the sixty-cycle modulating voltage will be applied to the transmitter slightly prior to the time when the contact member 50 engages one of the contact segments 52. Thus, for reasons to be explained hereinafter, the carrier will be modulated at the instant it comes on the air.

*Apparatus at distant mechanism*

The portion of the apparatus located at the aircraft or other distant mechanism to be controlled is shown in Figure 2. As herein shown, a radio receiver of the superregenerative type is connected to an antenna 68 carried by the robot aircraft. This receiver consists of a single vacuum tube 70, the plate supply of which is furnished from a B+ source, shown by the terminals 71 of a B battery supply, through the primary winding 72 of an audio transformer 74. The secondary winding 76 of the transformer 74 is connected at one end to the grids of a pair of amplifier tubes 78 and at the other end to the negative terminal of the bias battery 79, the positive terminal of which is connected to ground. The cathodes of the tubes 78 are likewise grounded. The plates of the tubes 78 are connected to the B+ supply through the audio chokes 80 and 82. Condensers 84 and 86 are connected in parallel with the respective chokes 80 and 82 so as to constitute a parallel resonant audio-frequency filter circuit in each case. The filtered audio-frequency voltage is then fed through the coupling condensers 88 and 90 to the grids of grid leak detector tubes 92 and 94, respectively. The grids of the tubes 92 and 94 are connected to ground through the grid leak resistors 96 and 98. In the plate circuit of the detector tube 92 is located the field coil 99 of a double-pole relay 100. Similarly, in the plate circuit of the detector tube 94 is located the field coil 102 of a single-pole relay 104.

It is well known that the superregenerative detector type of receiver produces a characteristic hissing sound of rather high frequency when no signal is being received. However, upon the reception of a signal the sensitivity of the detector is considerably reduced and the hissing sound disappears. The high-pass filter consisting of the elements 82 and 86 is preferably tuned to the frequency of the superrengerative hiss or to one of the higher frequency components thereof and will pass the hiss frequency to the grid leak detector 94. This will cause the plate current of the tube 94 passing through the field coil 102 of the relay 104 to be reduced, thereby causing the back contact of the relay to be closed which completes the circuit through battery 106 and solenoid 108. When thus energized, the solenoid will pull down armature 110 against the resistance of a spring 112 and so cause a bell crank 114 pivotally connected to the upper end of the armature to be rocked in a clockwise direction. The bell crank 114 is loosely pivoted on one end of a shaft 116 to which is secured a ratchet wheel 118 located in close proximity to the bell crank. The opposite arm of the bell crank is provided with a pawl 120 which is urged into engagement with the teeth of the ratchet 118 by means of a spring (not shown). Thus, each time the solenoid is energized, the shaft 116 will be given one step of motion in a clockwise direction. During the time that the contact member 50 (Fig. 1) is passing over one of the segments 52, the carrier is on and no hiss will be present in the receiver output. Hence, the plate current of tube 94 will rise and the armature of relay 104 will be pulled in. This will break the circuit to the solenoid 108 and the spring 112 will pull up the armature 110. The pawl 120 will thus be moved around to engage the next tooth on the ratchet wheel 118.

Also secured to the shaft 116 are two rotary contact members 122 and 124. These contact members cooperate with contact segments 126 and 128 which are located around the periphery of annular rings 130 and 132, respectively.

A pair of servomotors 134 and 138, which are preferably electric motors of the permanent-magnet type, are operatively connected with the control surfaces of the robot aircraft through suitable gearing and linkages and cause these surfaces to be operated when the servomotors are energized. The servomotor 134 is operatively connected with the elevator of the aircraft and will move this element either up or down depending upon the direction of current flow through the winding of the motor. The servomotor 138 is operatively connected with the rudder of the aircraft and will cause the rudder to be moved to either the right or the left depending upon the direction of the current flow through this motor. The servomotors 134 and 138 are adapted to be energized for operation by means of a battery 140. When the back contacts of the relay 100 are closed, the negative terminal of the battery 140 will be connected to a brush 142 bearing against the face of the contact member 122 while the positive terminal of the battery will be connected to a brush 144 bearing against the face of the contact member 124. This will cause the servomotor 134 to be energized to operate the elevator either up or down, depending upon the position of the contact members 122, and 124 or alternatively, the servomotor 138 will be energized to move the rudder right or left in accordance with the position of the contact members. With the contact member 122 and 124 in the position shown in Figure 2, the motor 134 will be energized to move the elevators up whereas with the next step of rotation of the shaft 116, the motor 138 will be connected with the battery 140 to cause the rudder to be moved to the right. A further step of the shaft 116 will condition the motor 134 for operation in the opposite direction to move the elevator down while still an additional step of the shaft will condition the motor 138 for operation in such a direction as to cause the rudder to be moved to the left, When an audio-frequency signal is impressed upon the radio frequency carrier wave, this signal will be passed through the low-pass filter consisting of the elements 80 and 84 which are tuned to the frequency of the audio signal and thereby cause the plate current of the detector 92 to be reduced. This will allow the armature of the relay 100 to engage the back contacts and thereby connect the battery with the brushes 142 and 144. It will thus be seen that whenever the audio-frequency signal is present, either the motor 134 or the motor 138 will be energized to move the control surfaces of the aircraft in one direction or the other depending upon the position occupied by the contact members 122 and 124 at that particular moment.

*Operation*

The operation of the device is as follows: When the operator at the ground station desires to give the controlled aircraft "up" elevator, the stick 45 is pulled back which causes the plunger 43 to be projected into the path of the stop nose 39. By virtue of the lost-motion connection between the disc 26 and the stop member 30, this nose will contact the plunger 43 and cause sixty-cycle modulation current to be applied to the primary of the transformer 57 just prior to the time when the contact member 50 engages the corresponding contact segment 52. Hence, the radio-frequency carrier wave will be modulated from the outset and, as a result, no hiss frequency will be present in the output of the receiver and the solenoid 108 will not be energized. Due to the presence of the sixty-cycle modulation on the carrier wave, the armature of the relay 100 will close the back contacts thereof and thus cause the servomotor 134 to operate the elevator of the aircraft in an upward direction. The stick 44 is then moved back to neutral which removes the plunger 43 from the path of the nose 28, thereby allowing the shaft 22 to again revolve. The contact member 50, however, will remain in engagement with the segment 52 for a short interval after the plunger 43 is retracted and, since the sixty-cycle modulation frequency is now off while the carrier is on, a hiss frequency will not appear in the output of the receiver and the shaft 116 will remain in position. After the contact member 50 leaves the segment 52 the carrier will be off and the hiss will appear in the receiver reducing the plate current of the tube 94 to allow the back contact of the relay 104 to be closed to effect energization of the solenoid 108 and cause the shaft 116 to be given one step of movement. The aeroplane will now fly with "up" elevator as long as the stick 45 remains in neutral position. The elevator may be neutralized by pushing the stick forward so as to cause the plunger 41 to be projected into the path of the nose 39. When this is done, the contact member 50 will again be stopped and a continuous carrier wave modulated with a sixty-cycle signal will be transmitted. The shaft 116 at the receiver will also be stopped since no further pulses are transmitted. The presence of the modulating frequency will cause the relay 100 to energize the motor 134 to operate the elevator back to neutral position. When the airplane is again flying level, the stick 45 is moved back to center position. The plunger 41 is thereby retracted and the shafts 22 and 116 will again revolve in synchronism until the next control is applied.

Modifications

If desired, various modifications may be made in the construction of the device without departing from the spirit of the invention. For example, the rotary contact member 50 and the segments 52 located in the annular ring 54 may be replaced by a four-nosed cam 150 secured on the end of the shaft 22 as shown in Fig. 3. This cam cooperates with a leaf switch 152 and causes the same to be opened and closed four times for each revolution of the shaft. By connecting one element of the switch to the B+ supply and the other to one end of the secondary winding of the modulation transformer 57, the carrier will be turned on and off four times for each revolution of the shaft 22.

A modification of the stop mechanism at the transmitter is shown in Fig. 4 wherein the stop member 30 is arranged to cooperate with pins 154 which are projected laterally from a fixed plate 156. The pins 154 may be connected with the Bowden cables 44 in the same manner as the plungers 40, 41, 42 and 43 shown in Fig. 1.

As shown in Fig. 5, an escapement mechanism may be used at the aircraft installation instead of the solenoid shown in Fig. 2. In this embodiment of the invention, the shaft 116 at the aircraft is adapted to be yieldably driven by a constantly rotating motor and slip clutch arrangement similar to that shown in Fig. 1 or by any other sort of a yieldably driven mechanism. The shaft is then allowed to escape in a step-by-step manner by means of an escapement mechanism, consisting of a disc 160 secured to the shaft 116 and provided with escape pins 162. An escapement pawl 164 is pivoted in the framework at 166 and is adapted to be rocked back and forth by means of a relay armature 170 which is connected with the pawl by means of a link 168. The armature 170 is a part of the relay 104 shown in Fig. 2 and for each cycle of operation of the relay the shaft 116 will be allowed to escape to a new position by virtue of the escapement pawl 164.

Figure 6A:
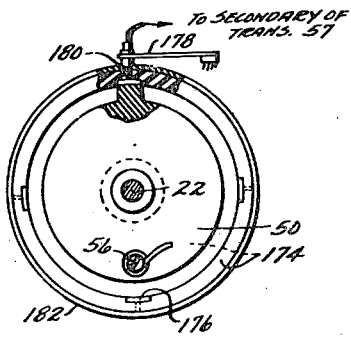
Fig. 6a is a side elevational view of Fig. 6 with parts shown in section.

Figs. 6 and 6a of the drawings show a construction for synchronizing the mechanism at the aircraft with the mechanism at the ground station, this structure consisting of a rotatable ring 174 of insulating material which carries contact segments 176 adapted to be engaged by the rotary contact member 50 mounted on the shaft 22. The ring 174 is mounted for rotation on the shaft 22 and is adapted to be held in each new position by means of a leaf spring 178 engaging in depressions 180 formed in a metal ring 182 extending about the outer periphery of the ring 174. Each of the contact segments 176 is electrically connected with the ring 182 and the leaf spring 178, which is at all times in engagement with the latter ring, is electrically connected with one end of the secondary winding of the modulation transformer 57. Hence, each time the contact member 50 engages one of the segments 176, the transmitter will be connected with its B+ supply and a radio frequency signal will be transmitted. By rotating the ring 174 either backward or forward by means of the hand knob 184, the shaft 116 at the receiver may be stepped forward or backward one step with respect to the shaft 22 at the transmitter. Thus, by rotating the ring 174 through the proper number of steps the two mechanisms may be brought into synchronism.

While permanent magnet servomotors were illustrated in connection with the embodiment of the device shown in Fig. 2, since this type of motor is automatically braked upon being de-energized thus preventing any overrunning of the control being applied, it is to be understood a three-wire type of servomotor may also be adapted for use in operating the controls of the aircraft. As shown in Fig. 7 of the drawings, the three-wire servomotors 188 and 190 may be selectively energized by the battery 192 for operation in either direction by means of a single contact member 194 secured to the shaft 116 and cooperating with the contact segments 196 mounted in the annular ring 198. A brush 200 bearing against the face of the contact member 194 is connected to one terminal 192a of the battery 192 through the contact 202 of a relay 204. This relay is inserted in the plate circuit of the tube 92 shown in Fig. 2 and is adapted to cause the contact 202 to be closed upon the reception of an audio-frequency signal by the aircraft receiver. The other terminal 192b of the battery 192 is connected to the central terminal of each of the servomotors 188 and 190 and the other two terminals of each of these motors are connected to the four segments 196 spaced about the ring 198. As in the case of the servomotors 134 and 138, one of the servomotors 188 and 190 may be operatively connected to the elevator and the other to the rudder to cause either up and down or left and right motion of the aircraft.

In case it should be found desirable to use compressed air servomotors instead of electrical servomotors for operating the controls of the aircraft, this may be accomplished by means of the apparatus shown in Figure 8. As herein shown, a portion of the compression from the aircraft engine is supplied to an accumulator tank 212 through a conduit 210. The compressed fluid from this tank is delivered to the two pilot valves 214 and 216 through a solenoid operated valve 218 and the conduits 220 and 222. The pilot valves 214 and 216 are communicatively connected in a well-known manner with a rudder servocylinder 224 and an elevator servocylinder 226, respectively, so as to cause operation of the airplane control surfaces 228, 230 whenever the valves are moved out of their neutral positions. The spools 213 and 215 of the pilot valves 214 and 216, respectively, are connected to rods 232 and 234, respectively, which carry rollers 236 at their outer ends engaging the groove 238 of a box cam 240. This cam is secured to the shaft 116 (Fig. 2) and will therefore be stepped around by the solenoid 108 in the same manner as the contact members 122 and 124 which it replaces. The groove 238 in the cam 240 is provided with two neutral portions 242 and 244 which cause the spools of the pilot valves to be located in their neutral positions when the rollers 236 are in these portions of the groove. The groove is also provided with a "left-down" portion 246 and a "right-up" portion 248 for causing the pilot valve spools 213 and 215 to be moved out of neutral position to cause corresponding movement of the control surfaces of the aircraft.

In order to prevent operation of the pneumatic servomotors except when an audio-control signal is received, the valve 218 is interposed between the accumulator tank 212 and the conduits 220 and 222. This valve is adapted to be moved to either one of two positions by means of a solenoid 250 which in turn is controlled by a relay 252 inserted in the plate circuit of the vacuum tube 92 (Fig. 2). When the armature of the relay is released by the field coil thereof so as to close the back contacts, the solenoid is energized by the battery 254 and moves the valve to the position shown in Fig. 8 in which pressure from the tank is furnished to the conduits 220 and 222. When the field coil of the relay is energized, the solenoid circuit is broken and the conventional solenoid return spring (not shown) rotates the valve in a counterclockwise direction so as to cut off the pressure from the tank and vent the lines 220 and 222 to atmosphere through the vent tube 256.

By means of the above construction, the controls of the aircraft or other remotely controlled device may be operated in a simple and effective manner by means of power derived directly from the engine of the device.

In the apparatus hereinbefore described the use of a single radio-frequency carrier wave modulated with an audio-frequency control signal was contemplated. It is to be realized, however, as shown in Fig. 9, that the same sort of an arrangement might be used with a continuous carrier wave modulated by two different audio-frequency signals $f'$ and $f''$. In order to adapt the device to this sort of use, the high-pass filter shown in Fig. 2 should be designed to pass the higher of the two audio-frequencies in place of the hiss frequency of the superregenerative receiver, and the low-pass filter should be designed to pass the lower of the two audio frequencies. By interrupting the higher of the two audio frequencies $f''$ at regular intervals in the same manner that the carrier wave is interrupted in Fig. 1, a suitable means would then be provided for synchronizing the rotating mechanism at the transmitter with that at the receiver. The lower of the two audio frequencies $f'$ could then be used to control the operation of the rudder and elevator of the aircraft in the same manner as the audio-frequency control signal in the apparatus described in connection with Fig. 1 and Fig. 2.

Figure 9A:
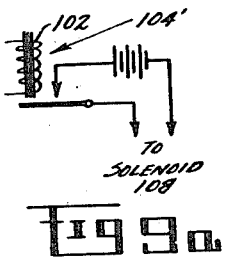
Fig. 9a shows another form of the high pass relay of Fig. 2 made necessary by the use of the modification shown in Fig. 9.

In using the apparatus described in Fig. 9 it becomes necessary to modify the relay 104 of Fig. 2 such that the contacts are adapted to be closed upon energization of the coil 102, as shown by 104' in Fig. 9a, for proper operation of the apparatus.

Figure 10:
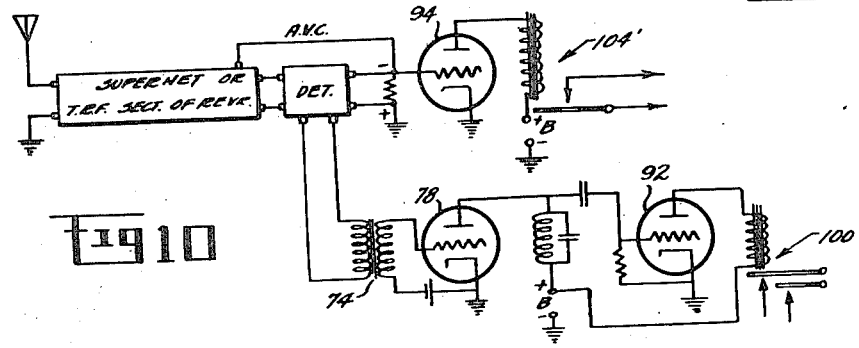
Fig. 10 shows a conventional superheterodyne or TRF receiver that may be utilized in substitution for the receiver of Fig. 2.

It should also be noted that the shafts 22 and 116 may be kept in synchronization by utilizing the AVC voltage of a superheterodyne or TRF receiver, as shown in Fig. 10, to control the operation of the synchronizing relay 104. Thus when the carrier is interrupted, the AVC voltage is reduced to zero and the contact of the relay will be closed to thereby energize the solenoid 108. When, however, the carrier wave is on, the AVC voltage will be high and the relay will be deenergized to break the contact and deenergize the solenoid. A single audio-frequency signal is used in the same manner as before to control the energization of the control relay 100. With an arrangement such as this, the high-pass filter could be dispensed with, a single low-pass filter being used for passing the audio-frequency.

Figure 11:
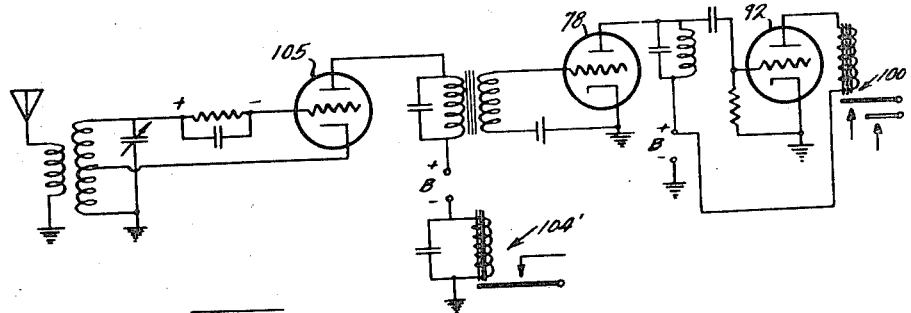
Fig. 11 shows a conventional regenerative type of receiver that may be used in substitution for the receiver of Fig. 2.

Still a further possibility would lie in the use of a regenerative type of receiver at the aircraft, as shown in Fig. 11, including a tube 105 with the synchronizing relay 104' placed in the plate circuit of the regenerative detector tube. Under these conditions when the carrier is on, the plate current of the detector tube will be reduced and the relay armature will open the contact so as to de-energize the solenoid 108. When the carrier is interrupted the plate current will be increased and the relay will be energized to close the contact and thus energize the solenoid. Here again, only one filter would be necessary for passing the single audio-frequency signal which controls the operation of the rudder and elevator servomotors.

As shown in Figs. 12 and 13, it is also possible to modify the present invention so as to enable two or more controls to be applied to the airplane simultaneously. For example, should it be found desirable to apply both pitching and yawing movement to the airplane at the same time, this can readily be accomplished by the use of one continuous carrier wave modulated with four audio frequencies $f_1$, $f_2$, $f_3$, and $f_4$, two of which, shown as $f_2$ and $f_3$, are used for synchronizing the transmitter and receiver mechanisms and the remaining two, $f_1$ and $f_3$, for controlling the operation of the servomotors. In order to accomplish this result, the mechanical structure shown in Fig. 1 must be duplicated throughout with the exception of the driving motor and the control stick. That is, another pair of shafts 16' and 22' would have to be provided, these shafts being driven by the same motor 10 that drives the shafts 16 and 22. The second shaft 22' corresponding to the shaft 22 would be provided with the same stop mechanism and the same carrier-interrupting mechanism but would be provided with only two plungers 41' and 43' for cooperation with the stop nose 39 in place of four, the other two plungers 40' and 42' being located in the duplicate ring 38. The plungers 40'—43' would preferably be operated by solenoids 40''—43'', though Bowden cables could be used, and the control stick 45 shown in Fig. 1 would preferably be replaced by a "Dep" type control 47. Forward or backward movement of the control column to control the elevator will cause switch 47a to be closed with the column in the forward position and switch 47b to be closed with the column in its rearward position. The closure of either of these switches will cause the plunger solenoids on one of the rings 38 to be energized to project the plungers into the path of the stop nose 39. The wheel on the control column, which is used for rudder control, would be arranged to close switch 47c when turned clockwise from neutral position and switch 47d when turned counterclockwise from neutral position. The closure of these two switches will cause the plunger solenoids on the other ring 38' to be energized so as to cause these plungers to be projected into the path of the stop nose 39. With this arrangement, two switches could be closed at the same time, one by the control column and one by the wheel. Thus, one plunger could be projected into the path of the stop nose on each of the rings 38 and 38'. The transmitter should, of course, be arranged for continuous operation, the two rings 54 and 54' now being used to interrupt two of the four audio frequencies modulating a continuous carrier wave so as to provide synchronizing signals for each of two control shafts located at the receiver. The plungers in the two rings 38 and 38' control the other two audio frequencies, one set of plungers serving to control the operation of the rudder servomotor at the aircraft and the other set of plungers serving to control the elevator servomotor at the aircraft.

The mechanical structure located at the receiver (Fig. 2) would also have to be duplicated throughout as illustrated in Fig. 13, with the exception of the servomotors 134 and 138. Another pair of rings 130' and 132' similar to 130 and 132 would have to be provided for a second shaft 116' operated by a second solenoid mechanism 108', the servomotor 134 being connected with the pair of rings 130 and 132 and the second servomotor 138 being connected with the second pair of rings 130' and 132'. The receiver would, of course, be provided with four audio-frequency filters consisting of elements 82—84, 82'—84', 82''—84'', and 82'''—84''', designed to pass frequencies $f_2$, $f_1$, $f_4$, and $f_3$, respectively, and four relays 100, 100', 104, and 104'; two of the relays 104 and 104' controlling the energization of the two solenoids 108 and 108' and the other two relays 100 and 100' controlling the energization of the servomotors 134 and 138. In the presence of signal frequencies $f_2$ and $f_4$ the contacts of relays 104 and 104' are open; and in the presence of signal frequencies $f_1$ and $f_3$ the contacts of relays 100 and 100' are closed. Synchronization of the system functions in the same manner as described for Figs. 9 and 9a.

The operation of the device is as follows:

In case it is desired to cause the robot aircraft to dive to the right, the control column is pushed forward and the wheel turned clockwise by the operator at the ground station. This causes a plunger on each of the rings 38 and 38' to be projected into the path of each of the stop noses 39 thus stopping each of the shafts 22 and 22' and causing two audio-frequency signals to be applied to the carrier. Inasmuch as the two audio-frequency synchronizing pulses will now be interrupted, the two shafts 116 and 116' at the receiver will stop rotating, the position in which they are stopped depending upon which of the plungers are operated. Accordingly, the control relays 100 and 100' will close the circuits through the servomotors 134 and 138, respectively, and will cause the desired operation of the elevator and rudder to be effected.

It will be observed from the foregoing description that the remote control system which I have devised is simple, flexible and easily modified to suit the particular needs of various types of installations. It is to be understood, therefore, that the particular constructions shown and described herein are merely to be taken by way of example and not as a limitation of scope of my invention, the meets and bounds of which are defined in the following claims:

I claim:

1. A remote control system for enabling a distant mechanism to be operated from a control station comprising a radio transmitter located at the control station, means for causing said transmitter to repeatedly transmit a group of synchronizing pulses, means for disabling said first-mentioned means and causing a control signal to be transmitted after the transmission of any selected pulse of said group of pulses, a radio receiver located at the distant mechanism, means connected with said receiver for detecting said synchronizing pulses and said control signal, a movable control element adapted to be moved in sequence from one position to another, means connected with said detecting means for causing said control element to be moved to a different position each time one of the synchronizing pulses is received, one or more normally inactive reversible servomechanisms for controlling the operation of said distant mechanism, means for selectively conditioning said servomechanisms for operation in a forward or a reverse direction in accordance with the position of said control element, and means operably connected with said detecting means for rendering said servomechanisms effective to control the operation of said distant mechanism in a particular manner whenever a control signal is received.

2. A remote control system for enabling a distant mechanism to be operated from a control station comprising a radio transmitter located at the control station, keying means for causing said transmitter to repeatedly transmit a group of radio-frequency pulses, means for disabling said keying means and causing said transmitter to emit a continuous radio-frequency wave after the transmission of any selected pulse of said group of pulses, means connected with said disabling means for causing a control signal to be transmitted as modulation on the continuous radio-frequency wave, a radio receiver located at the distant mechanism, means connected with said receiver for detecting said radio-frequency pulses, means connected with said receiver for detecting said control signal, a movable control element adapted to be moved in sequence from one position to another, means connected with said radio-frequency pulse detecting means for causing said control element to be moved to a different position each time one of the radio-frequency pulses is received, normally inactive reversible servomechanisms for controlling the operation of said distant mechanism, means for selectively conditioning said servomechanisms for operation in a forward or a reverse direction in accordance with the position of said control element, and means operably connected with said control signal detecting means for rendering said servomechanisms effective to control the operation of said distant mechanism in a particular manner whenever a control signal is received.

3. The invention as defined in claim 2 wherein said keying means comprises a rotary type switch.

4. A remote control system for enabling a distant mechanism to be controlled from a designated control station comprising a radio transmitter at the control station and a radio receiver at the distant mechanism, a cyclically operable member at the control station, a contact device operably connected with said cyclically operable member, said contact device having "on" and "off" positions electrical connections between said contact device and said transmitter for switching said transmitter on and off a plurality of times during each cycle of operation of said cyclically operable member so as to cause a series of radio-frequency pulses to be transmitted, means for stopping said cyclically operable member and said contact device in any one of a plurality of different positions in each of which said contact device is in its "on" position so as to cause said transmitter to emit a continuous radio-frequency wave, means cooperating with said stopping means for causing the continuous radio-frequency wave to be modulated with a control signal whenever said cyclically operable member and said contact device are stopped, a radio receiver located at the distant mechanism, means connected with said receiver for detecting the radio-frequency pulses, means connected with said receiver for detecting said control signal, a rotary contact device at the distant mechanism, means connected with said radio-frequency pulse detecting means for causing said contact device to be stepped ahead each time one of the pulses is received, a plurality of normally deenergized reversible servomechanisms operably connected with said rotary contact device, means for selectively conditioning said servomechanisms for forward or reverse operation in accordance with the position of said contact device, and means operably connected with said control signal detecting means for causing said servomechanisms to be energized during the time that the control signal is being received and thereby cause the operation of said distant mechanism to be controlled in a particular manner.

5. The invention as defined in claim 4 wherein said stopping means comprises a plurality of normally ineffective stop elements spaced along the path of movement of said cyclically operable control member, and a manipulable means for rendering any one of said elements effective to stop the operation of said member.

6. A remote control system for enabling a distant mechanism to be operated from a control station comprising a radio transmitter located at the control station, a rotating shaft located at the control station, means connected with said rotating shaft for switching said transmitter on and off a plurality of times for each revolution of said shaft so as to produce a series of radio-frequency pulses, said switching means having "on" and "off" positions, means for stopping the operation of said shaft with said switching means in its "on" position so as to cause said transmitter to emit a continuous modulated radio-frequency wave, means cooperating with said stopping means for causing the continuous radio-frequency wave to be modulated with a control signal whenever said shaft and said switching means are stopped, a radio receiver located at the distant mechanism, a radio-frequency pulse detecting circuit connected with said receiver, a control signal detecting circuit connected with said receiver, a first relay connected with said pulse-detecting circuit so as to be activated each time a radio-frequency pulse is received, a second relay connected with said control signal detecting circuit so as to be activated whenever a control signal is received, a rotary contact device, means controlled by said first relay for stepping said contact device ahead one step each time a radio-frequency pulse is received, a plurality of normally deenergized reversible servomechanisms operably connected with said rotary contact device, means for selectively conditioning said servomechanisms for forward or reverse operation in accordance with the position of said contact device, and means connected with said second relay for causing said servomechanisms to be energized upon the reception of a control signal and thereby cause the operation of said distant mechanism to be controlled in a particular manner.

7. A remote control mechanism for enabling a distant aircraft to be controlled from a ground station comprising a radio transmitter at the ground station and a radio receiver at the distant aircraft; a cyclically operable member at the ground station; a contact device operably connected with said cyclically operable member, said contact device having "on" and "off" positions and being adapted to switch said transmitter on and off a plurality of times during each cycle of operation of said cyclically operable member so as to cause a series of radio-frequency pulses to be transmitted; means for stopping said cyclically operable member and said contact device in any one of four different positions in each of which said contact device is in its "on" position so as to cause said transmitter to emit a continuous radio-frequency wave, said last-named means including four normally ineffective stop elements spaced along the path of movement of said cyclically operable control member, and a control "stick" movable to any one of four different positions for rendering said stop elements selectively effective to stop the operation of said member; means cooperating with said stopping means for causing the continuous radio-frequency wave to be modulated with a control signal whenever said cyclically operable member and said contact device are stopped; a radio receiver located at the distant mechanism, a radio-frequency pulse detecting circuit connected with said receiver; a control signal detecting circuit connected with said receiver; a first relay connected with said pulse detecting circuit so as to be activated when a radio-frequency pulse is received; a second relay connected with said control signal detecting circuit so as to be activated when a control signal is received; a rotary control device; means controlled by said first relay for stepping said control device ahead one step each time a radio-frequency pulse is received; a plurality of normally deenergized reversible servomechanisms operably connected with said rotary control device for controlling the operation of the aircraft, means for selectively conditioning said servomechanism for forward or reverse operation in accordance with the position of said rotary control device; and means connected with said second relay for causing said servomechanisms to be energized upon the reception of a control signal and thereby cause the operation of said distant mechanism to be controlled in a particular manner.

8. The invention as defined in claim 7 wherein means is provided for varying the number of times that said transmitter is switched "on" and "off" for each revolution of said shaft thereby enabling the angular position of said rotary control device at the aircraft to be varied with respect to the angular position of said shaft.

9. A remote control system for enabling a distant mechanism to be operated from a control station comprising a radio transmitter located at the control station, means for causing said transmitter to repeatedly transmit a group of synchronizing pulses, means for disabling said first-mentioned means and causing a control signal to be transmitted after the transmission of any selected pulse of said group of pulses, a radio receiver located at the distant mechanism, means connected with said receiver for detecting said synchronizing pulses and said control signal, a movable control element at said distant mechanism adapted to be moved in sequence from one position to another, means connected with said detecting means for causing said control element to be moved to a different position each time one of the synchronizing pulses is received, fluid servomotors for controlling the operation of said mechanism, normally ineffective pilot valves for controlling the operation of said servomotors, means connected with said control element for variably positioning said pilot valves in accordance with the position of said control element, and valve means operably connected with said detecting means for rendering said normally ineffective pilot valves effective to control the operation of said servomotors whenever a control signal is received.

10. A remote control system for enabling a distant mechanism to be controlled from a designated control station comprising a radio transmitter at the control station and a radio receiver at the distant mechanism, a cyclically operable member at the control station, a contact device operably connected with said cyclically operable member, said contact device having "on" and "off" positions and being electrically connected with said transmitter so as to switch said transmitter on and off a plurality of times during each cycle of operation of said cyclically operable member so as to cause a series of radio-frequency pulses to be transmitted, means for stopping said cyclically operable member and said contact device in any one of a plurality of different positions in each of which said contact device is in its "on" position as to cause said transmitter to emit a continuous radio-frequency wave, means cooperating with said stopping means for causing the continuous radio-frequency wave to be modulated with a control signal whenever said cyclically operable member and said contact device are stopped, a radio receiver located at the distant mechanism, a radio-frequency pulse detecting circuit connected with said receiver, a control signal detecting circuit connected with said receiver, a first relay so connected with said pulse detecting circuit as to be energized each time a radio-frequency pulse is received, a second relay so connected with said control signal detecting circuit as to be energized whenever a control signal is received, a rotary control device, means controlled by said first relay for stepping said control device ahead one step each time a radio-frequency pulse is received, fluid servocylinders for controlling the operation of said mechanism, normally ineffective pilot valves for controlling the operation of said servocylinders, means connected with said rotary control device for controlling the position of said pilot valves in accordance with the position of said control device, a source of pressurized fluid, and a solenoid operated valve controlled by said second relay for controlling the flow of fluid to said servomotors, said valve being actuated to supply fluid under pressure to said pilot valves whenever a control signal is received thereby causing said distant mechanism to be controlled in a particular manner.

11. A remote control system for enabling a distant mechanism to be controlled from a designated control station comprising a radio transmitter at the control station, means for modulating the output of said transmitter with a synchronizing signal, means for modulating the output of said transmitter with a control signal, a cyclically operable member at the control station, a contact device operably connected with said cyclically operable member, said contact device having "on" and "off" positions and being adapted to switch said synchronizing signal on and off a plurality of times during each cycle of operation of said cyclically operable member so as to cause a series of synchronizing pulses to be transmitted, means for stopping said cyclically operable member and said contact device in any one of a plurality of different positions, means cooperating with said stopping means for causing the control signal to be transmitted whenever said cyclically operable member and said contact device are stopped, a radio receiver located at the distant mechanism, means connected with said receiver for detecting the synchronizing pulses, means connected with said receiver for detecting the control signal, a rotary control device at the distant mechanism, means connected with said synchronizing pulse detecting means for causing said control device to be stepped ahead each time one of the pulses is received, a plurality of normally deenergized reversible servomechanisms operably connected with said rotary control device for controlling the operation of said distant mechanism, means for selectively conditioning said servomechanism for forward or reverse operation in accordance with the position of said rotary control device, and means connected with said control signal detecting means for causing said servomechanisms to be energized when the control signal is received and thereby cause the operation of the distant mechanism to be controlled in a particular manner.

STANLEY B. WHITE.

REFERENCES CITED

The following references are of record in the file of this patent:

UNITED STATES PATENTS

| Number | Name | Date |
|---|---|---|
| 1,525,431 | Phillips | Feb. 3, 1925 |
| 1,597,416 | Mirick | Aug. 24, 1926 |
| 2,176,469 | Moueix | Oct. 17, 1939 |
| 2,235,768 | Luck | Mar. 18, 1941 |
| 1,623,121 | Kettering | Apr. 5, 1927 |
| 1,792,937 | Sperry | Feb. 17, 1937 |
| 1,818,708 | Hammond | Aug. 11, 1931 |
| 2,284,509 | Boes et al. | May 26, 1942 |
| 1,766,524 | Loftin | June 24, 1930 |
| 1,137,222 | Leon | Apr. 27, 1915 |